Aug. 9, 1966  E. M. FISCHEL  3,264,880
GYROS WITH COMPENSATED FLEXURE PIVOTS
Filed Dec. 28, 1961  5 Sheets-Sheet 1
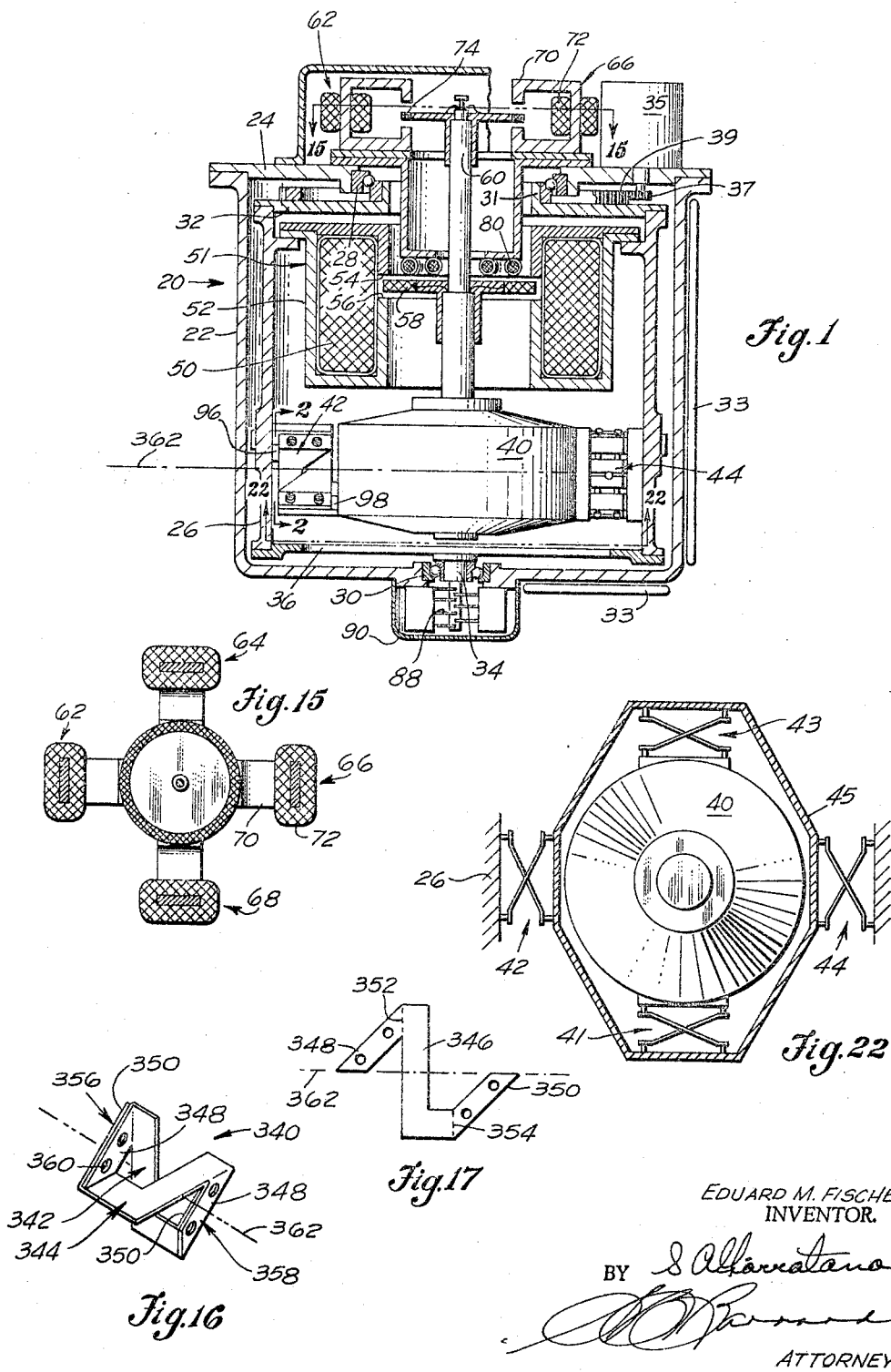
EDUARD M. FISCHEL
INVENTOR.
BY
ATTORNEYS Aug. 9, 1966  E. M. FISCHEL  3,264,880
GYROS WITH COMPENSATED FLEXURE PIVOTS
Filed Dec. 28, 1961  5 Sheets-Sheet 2
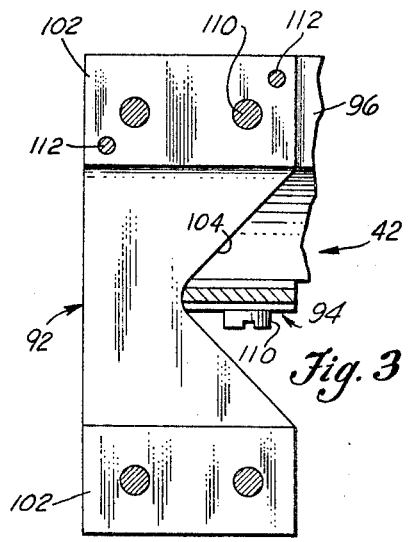
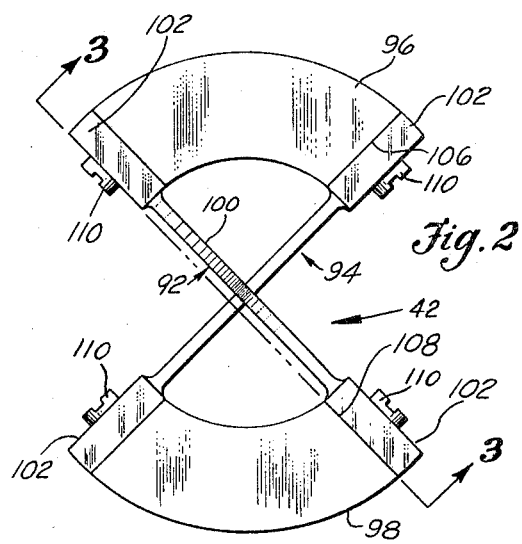
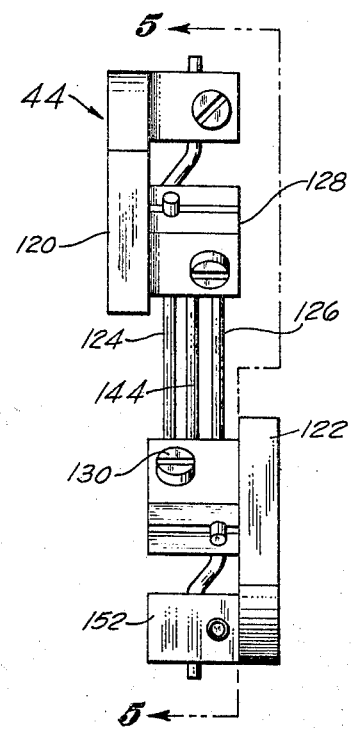
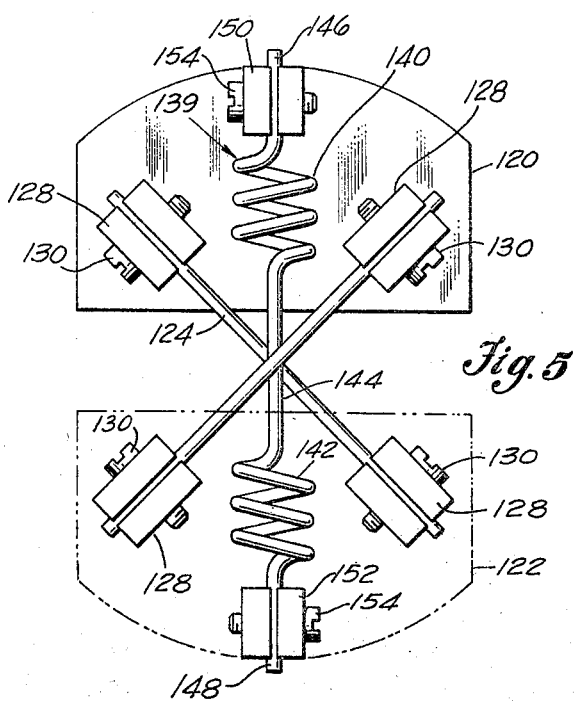
EDUARD M. FISCHEL
INVENTOR.
BY
ATTORNEYS

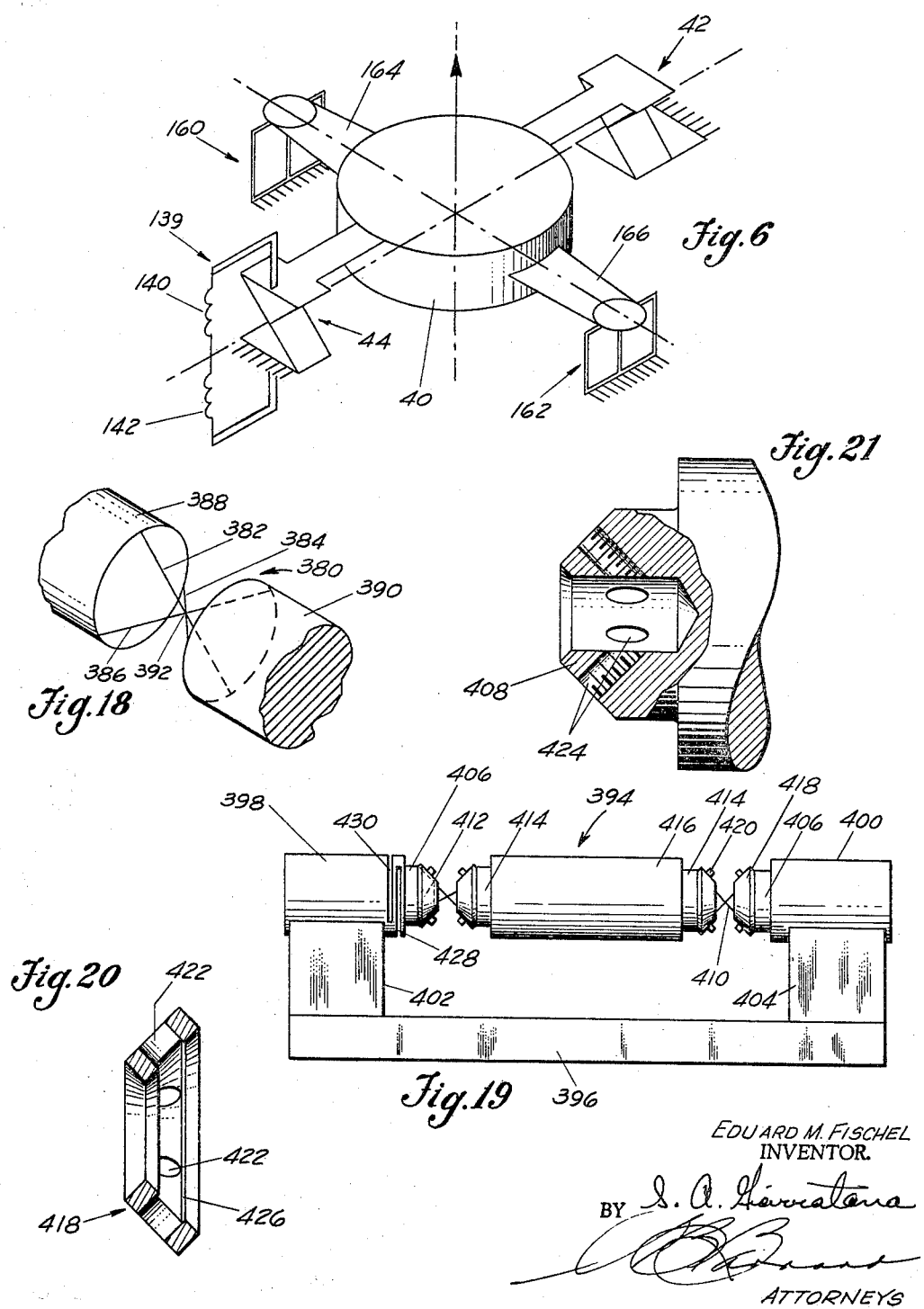

Aug. 9, 1966    E. M. FISCHEL    3,264,880
GYROS WITH COMPENSATED FLEXURE PIVOTS
Filed Dec. 28, 1961    5 Sheets-Sheet 4

EDUARD M. FISCHEL
INVENTOR.

BY
ATTORNEYS

EDUARD M. FISCHEL
INVENTOR.

United States Patent Office 3,264,880
Patented August 9, 1966

3,264,880
GYROS WITH COMPENSATED FLEXURE PIVOTS
Eduard M. Fischel, Wayne, N.J., assignor to General Precision Inc., Little Falls, N.J., a corporation of Delaware
Filed Dec. 28, 1961, Ser. No. 162,721
19 Claims. (Cl. 74—5)

The present invention relates to gyroscopes, and more particularly to a tight loop stabilized gyro having compensated flexure pivots defining the precession axis.

Flexure pivots are employed as a replacement for ball bearings on the precession or gimbal axis of a gyro. They have no friction, backlash or play, need no lubrication, withstand loads applied in any direction, and are not subject to wear. Further, the hysteresis effect as well as intergranular damping is insignificant for the small range of angular motions of a tight loop stabilized gyro. However, these pivots have an important disadvantage in that they develop a restraining torque when deflected.

The present invention overcomes this disadvantage by providing different types of spring devices to compensate for this restraining torque, including magnetic and electrical spring devices with linear characteristics, and mechanical springs, either alone, or in combination with magnetic or electrical compensating devices.

In accordance with an important feature of the invention, one of the two flexure pivots defining a procession axis is made stiff in the axial direction and the other soft to eliminate strain on the pivots caused by different expansion of the components of the gyro under changing temperatures. This combination of a stiff and soft pivot also obviates the need for close tolerances in the axial direction. In accordance with other important features of the invention, the support on which a gyro motor is mounted by the flexure pivots is rotated at a low speed around the spin axis of the gyro motor to compensate for disturbing torques around the precession axis caused by mass shifts and spring torques around the axis, and the flexure pivots are made iso-elastic so that the center of gravity of the gyro precession axis assembly will be deflected in line with the acting acceleration.

Accordingly, it is an object of the invention to avoid friction around the precession or gimbal axes of a gyro to minimize drift.

It is another object of the invention to compensate for the restraining spring torques developed in flexure pivots when deflected.

It is a further object of the invention to compensate for disturbing torques around the precession axis of a gyro with flexure pivots caused by mass shifts and spring torques around the precession axis.

It is a still further object of the invention to provide flexure pivots for the precession or gimbal axes of a gyro which eliminate large strain in the axial direction caused by differences in expansion of the components of the gyro under changing temperatures, and which also obviate the need for close tolerances in the axial direction.

It is a still further object of the invention to provide flexure pivots of the type described above which are iso-elastic, so that the center of gravity of the gyro precession axis assembly will be deflected in line with the acting acceleration.

It is a still further object of the invention to provide a high precision, minimum drift dry gyro which avoids the inherent difficulties of a wet gyro.

Other objects and features of novelty of the present invention will be specifically pointed out or will otherwise become apparent when referring, for a better understanding of the invention, to the following description taken in conjunction with the accompanying drawings, wherein:

FIG. 1 is a sectional view in elevation of a gyro embodying features of the invention;

FIG. 2 is an enlarged sectional view taken on the line 2—2 of FIG. 1;

FIG. 3 is a sectional view taken on the line 3—3 of FIG. 2;

FIG. 4 is an enlarged elevational view of the soft flexure pivot illustrated in FIG. 1;

FIG. 5 is a side view taken on the line 5—5 of FIG. 4;

FIG. 6 is a schematic view illustrating another embodiment of the invention;

FIG. 15 is a sectional view taken on the line 15—15 of FIG. 1;

FIG. 16 is an elevational view of another type of flexure pivot embodying features of the invention;

FIG. 17 is a plan view of one of the leaf springs of the flexure pivot illustrated in FIG. 16;

FIG. 18 is a fragmentary isometric view of still another type of flexure pivot;

FIG. 19 is an elevational view of a gyro employing flexure pivots of the type illustrated in FIG. 18;

FIG. 20 is an enlarged sectional view of one of the clamping rings employed by the gyro illustrated in FIG. 19;

FIG. 21 is an enlarged fragmentary view, partly in section, of the end of one of the stub shafts illustrated in FIG. 19 upon which the clamping ring of FIG. 20 is bolted; and FIG. 22 is a sectional view taken on the line 22—22 of FIG. 1.

Figure 8:
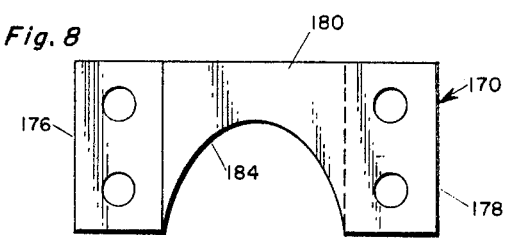
FIG. 8 is a plan view of one of the three leaf springs of the flexure pivot illustrated in FIG. 7.

Referring to FIG. 1, a gyro embodying features of the invention is illustrated which comprises a can-shaped housing 22 having the upper end thereof enclosed by a washer-shaped cover plate 24. A housing 26 is rotatably supported within the housing 22 by a ball bearing 28 at the upper end thereof, and a ball bearing 30 at the lower end thereof. The outer race of the ball bearing 28 is fixed in the central aperture in the cover plate 24, and the inner race thereof is fixed to a cylindrical flange 31 projecting upwardly from a washer-shaped cover plate 32 enclosing the upper end of the rotatable housing 26 similar to the manner in which the cover plate 24 encloses the upper end of the housing 22. The outer race of the ball bearing 30 is fixed in a central aperture in the bottom of the can-shaped housing 22 and the inner race thereof is fixed to rotate with a hollow shaft 34 projecting downwardly from a bottom cover plate 36 on the rotatable housing 26. The gyroscope 20 is temperature controlled by a heating jacket 33 on the outside of the housing 22. The rotatable housing 26 is rotated at a low speed by a small electric motor 35 supported on the cover plate 24 and having a pinion gear 37 drivingly connected to a large ring gear 39 on the cover plate 32 of the rotatable housing.

Referring to FIG. 22 as well as FIG. 1, a gyro motor 40 is pivotally supported in the lower part of the rotable housing 26 for two degree of freedom movement by a pair of flexure pivots 41 and 43 connected to a gimbal ring 45 and a pair of flexure pivots 42 and 44 connecting the gimbal ring to the rotatable housing 26. An electric spring 51 is provided by a coil 50 excited by D.C. current and supported within the rotatable housing 26 by an annular housing 52 of magnetically permeable material having spaced annular pole faces 54 and 56 placed to provide an air gap on the inner cylindrical surface thereof. An armature coil 58 also excited by D.C. current is carried on an arm 60 projecting upwardly from the gyro motor 40 for pivotal movement therewith in response to pivotal movement of the gyro motor about the two axes defined by the flexure pivots 41–44. In the zero position the coil 58 projects an equal distance into the air gap between the pole faces 54 and 56 and does not exert any torque on the arm 60. But when the gyro motor precesses, the coil 58 will be displaced in the air gap and exert a torque on the arm 60 proportional to the displacement of the coil 58 into the air gap and having a direction tending to further pivot the gyro motor. This torque can be made linear and carefully controlled to accurately compensate for the restraining spring torque developed in the flexure pivots, and having a direction tending to oppose the precession of the gyro motor as will be described in greater detail hereinafter. It is also noted at this point that a ring-shaped permanent magnet can be substituted for the coil 50 of the electric spring 51 to produce the flux across the air gap defined by the annular pole faces 54 and 56.

Referring to FIG. 15 as well as FIG. 1, the cover plate 24 also carries four orthogonally mounted position pickups 62, 64, 66, 68 which define two orthogonal axes aligned with the axes defined by the flexure pivots 41–44. Each of the position pickups comprises a C-shaped core 70 defining an air gap between the pole faces thereof and a coil 72 excited by A.C. current for generating lines of flux across the air gap. An armature coil 74 is carried on the upper end of the arm 60 in position to pass through each of the four air gaps. The armature coil 74 is attached to the upper end of the arm 60 for pivotal movement with the gyro motor 40. Each of the coils 72 is excited by A.C. current 90° out of phase with the A.C. current of the other coils and the armature coil 74 sends an induced voltage to two outside circuits which are phase sensitive, and produces two filtered D.C. signals which are transmitted to two control loops (not belonging to the gyro and not shown) for zeroing the deviation of the gyro motor 40 as indicated by the pivotal movement of the armature coil 74.

Four torquing coils 80 may be orthogonally mounted above the armature coil 58 on the same orthogonal axes defined by the pickup coils 72 for torquing the gyro in space. Opposing pairs of the torquing coils are interconnected and can be excited by D.C. current so as to generate a directive force under which the gyro starts to precess, the direction of the precession depending upon the pair of coils which is excited and the polarity of the exciting current. Suitable slip rings 88 enclosed by a cup-shaped cover 90 may be provided for energizing the various components of the gyro. Five slip rings are necessary for the excitation of the gyro motor 40 and the coil 50 and its armature coil 58, two slip rings for the pickup coils 72 and four more slip rings for the space torquing coils 80 which makes a total of eleven slip rings.

Both pairs of the flexure pivots are identical and therefore only one pair 42 and 44 will be described in detail with reference to FIGS. 2–6. The flexure pivot 42 which is illustrated in FIGS. 2 and 3 comprises two leaf springs 92 and 94 crossed at an angle of 90° with the opposite ends thereof secured to members 96 and 98. Each of the leaf springs 92 and 94 has a recessed middle portion 100 which forms the spring proper and end portions 102 which are several times thicker than the middle portion to provide better clamping and reduce local stress. The width of the middle portion 100 of each leaf spring as viewed in FIG. 3 is reduced by a V-notch 104 so that the outer portion thereof has the same width as the end portions 102 and the center portion thereof is a little less than one-half this width. This reduces the stiffness of the spring in the axial direction, as will be discussed in greater detail hereinafter.

Each of the end portions 102 is fixed to end faces 106 and 108 on the members 96 and 98, respectively, by bolts 110. The end faces are very accurately machined and the upper end portions 102 are accurately positioned on the end faces of the member 96 by dowel pins 112 (FIG. 3) to precisely fix the center at which they crisscross, so as to cooperate with the center of criss-cross of the flexure pivot 44 to accurately define one of the precession axes for the gyro motor 40. Each of the flexure pivots 42 and 44 is preferably assembled on a special assembly fixture which places the springs accurately on the members 96 and 98 so as to provide a subassembly already aligned for final assembly with the rotatable housing 26 and gimbal ring 45. As illustrated in FIG. 1, the member 96 is fixed to the wall of the rotatable housing 26 and the member 98 is fixed to the side of the gimbal ring 45.

Each of the leaf springs 92 and 94 is preferably forged or cut out of a strip of cold rolled spring material having the cross section illustrated in FIG. 2. Leaf springs whose cross-section is obtained by milling appear to be inferior because the elastic limit of the material is reduced. The shape of the leaf spring is independent of the spring material which is preferably clock steel, beryllium-copper, or iso-elastic steel.

The flexure pivot 44 is most clearly illustrated in FIGS. 4 and 5 and comprises upper and lower members 120 and 122, respectively, interconnected by stiff wires 124 and 126 having their ends clamped in slotted poles 128 projecting from the members 120 and 122, bolts 130 being provided to facilitate the clamping action. The wires 124, 126 are preferably made of a stiff music wire and the slotted poles 128 are very accurately machined and positioned on the members 120 and 122 so as to very precisely position the point at which the wires cross. The wires 124 and 126 have a much lower moment of inertia in the axial direction than do the leaf springs 92 and 94 and, therefore, a lower spring rate so that they cannot build up strong forces in the axial direction. This combination of a soft and a stiff flexure pivot avoids heavy axial strain on the pivots which could cause trouble in maintaining the required precise zero point of the flexure pivots.

As stated at the outset of this application, the flexure pivots 42 and 44 have many advantages over other kinds of pivots, such as bearings. They provide a firmer axis of rotation, have no friction, backlash, hysteresis, or sensitivity against small foreign particles, and no wear. The joints need no lubrication and are capable of withstanding loads applied in any direction. However, the flexure pivots do have the disadvantage of developing a restraining torque which opposes the pivotal movement of the gyro motor 40 and the gyro motor must also be kept in a tight looped stabilization which, however, is always the case in platform systems. In accordance with the present invention several different devices are provided for compensating for this restricting torque, including mechanical springs, electrical springs, magnetic springs, and or a combination of mechanical and electrical springs as is the case in the embodiment illustrated in FIG. 1. The mechanical spring 139 is most clearly illustrated in FIGS. 4 and 5 where it can be seen that it comprises two spaced helical spring portions 140 and 142 interconnected by a straight wire 144 and having projecting straight wire end portions 146 and 148 accurately clamped in slotted poles 150 and 152 projecting from the members 120 and 122, respectively, bolts 154 being provided to facilitate the clamping action as before. The slotted poles 150 and 152 very accurately position the spring 139 so that the line of action of the force exerted thereby and tending to draw the members 120 and 122 together, passes exactly through the precession axis defined by the flexure pivots 42 and 44. Because of this, the spring 139 does not exert any torque on the flexure pivot 44. However, when the gyro motor 40 precesses so as to pivot the member 122 either in a clockwise or counterclockwise direction relative to the member 120, the line of action of the spring force is displaced and no longer passes through the precession axis so as to exert a torque having a direction tending to increase the pivotal movement. For example, if the members 120 and 122 are pivoted relative to one another so as to displace the line of action of the spring to the left of the precession axis as viewed in FIG. 5, the amount of this displacement will constitute a moment arm for the force of the spring so as to produce a torque in a direction to assist this movement and oppose the restraining torque produced by the wires 124 and 126 when flexed. The compensation provided by the spring 139 is carefully coordinated with the compensation provided by the electric spring 51 so as to provide a very precise overall compensation for the restraining torque inherent in the flexure pivots 42 and 44.

In addition to the advantages provided by the flexure pivots 42 and 44 when compensated as described, the rotation of the rotatable housing 26 about the spin axis of the gyro motor 40 at low speed of six to twelve r.p.m. compensates for disturbing torques around the precession axes due to mass shifts in the plane thereof and spring torques around the axes. Also, the performance of the gyro is greatly enhanced by the combination of the axially stiff flexure pivot and the soft flexure pivot defining each axis. However, in accordance with another important feature of the invention, the performance of the gyro is improved still further by making the flexure pivots iso-elastic.

In order to obtain an iso-elastic flexure pivot, it is necessary that the compliance of the pivot be equal in all directions, so that the center of gravity of the gyro precession axis assembly will be deflected in line with the acting acceleration. Assuming that the assembly is properly aligned under no-load conditions, no precession torques will appear under load as long as the center of gravity and pivot axis are displaced exactly in line with the attacking force. For a typical cross band flexure pivot with two leaf springs crossed at an angle of 90° as in the case of the flexure pivot 42, the condition of iso-elasticity requires that the elasticity $C_R$ in a radial direction be exactly twice the elasticity $C_A$ in an axial direction along the pivot axis. It is apparent that a force along the pivot axis acts on two cross bands whereas a radial force perpendicular to the pivot axis acts either on one leaf spring 92, if in line with the spring, or on the equivalent of one spring, if intersecting the two leaf springs. Accordingly, the iso-elasticity condition is (1) $\qquad C_R = 2C_A$ Stated otherwise, the radial elasticity equals twice the axial elasticity.

Since each cross band pivot will be iso-elastic itself, if the above condition is met, the combination of two or more such pivots will maintain the iso-elasticity of the gyro suspension for either a single or a two-degree freedom gyro. A simple calculation shows that the condition of Formula 1, if applied to a straight rectangular leaf spring, requires a square shaped leaf (length equal width), and is independent of the thickness of the leaf spring. Flexure pivots having such square shaped leaf springs would obviously have relatively large bending stiffness in the axial direction and the axial dimension of the pivot would likewise be relatively large. Both of these can be reduced, relatively speaking, by employing the leaf springs with the substantially V-shaped cut out as illustrated in FIG. 3. An iso-elastic pivot which obeys Equation 1 above and uses springs of this shape will require less space in an axial direction and will have lower bending stiffness for the same load capacity.

In the embodiment of FIG. 1 wherein one stiff and one soft flexure pivot is employed to eliminate axial strains caused by different expansion of the components of the gyro under changing temperatures, the pivots can still be made iso-elastic. Both pivots must have the same radial stiffness $C_R$, and a combination of the two pivots must now obey Equation 1 in the following modified form:

(2) $\qquad C_R1 = C_R2 = C_A1 + C_A2$

Stated otherwise, the radial elasticity of each flexure pivot should be equal to the sum of the axial elasticity of both pivots.

As stated previously, the embodiment illustrated in FIG. 1 employs both an electrical and a mechanical compensation for the restraining torque developed by the flexure pivots 42 and 44. If a mechanical compensation, such as the spring 139, illustrated in FIGS. 4 and 5, is employed alone, its non-linear characteristic sets a limit for the maximum permissible angular deflection of the pivot. If desired, relatively small and lightweight electro-magnetic springs 160 and 162 may be provided as illustrated schematically in FIG. 6 to provide a simple and effective fine adjustment and calibration of the compensation provided by the nonlinear mechanical spring. As illustrated in FIG. 6 each of the electromagnets 160 and 162 is mounted in position to define an axis perpendicular to the precession axis defined by the fluxure pivots 42 and 44, and in position to act on the ends of arms 164 and 166 projecting radially from the opposite sides of the gyro motor 40. In the zero position the electromagnets exert an equal force on the arms so that zero torque is applied, but when the gyro motor precesses, the pull of one is weakened and the other strengthened to exert the compensating torque. If the electromagnetic springs 160 and 162 are made strong enough to realize full compensation, the nonlinear mechanical spring can be eliminated. Accordingly, a larger angular deflection of the pivot becomes possible, limited by either the residual nonlinearity of the electromagnetic spring or by the inherent nonlinearity of the flexure pivots. Both of these nonlinearities are small compared to the nonlinearity of the mechanical spring compensation method. At this point it is again noted that in any of these arrangements the compensation is required only over a small angular range about the zero point. The permissible residual spring rate depends on the drift specification for the gyro and is a function of the maximum expected angular deviation between the gyro input axes and the platform axes.

Figure 9:
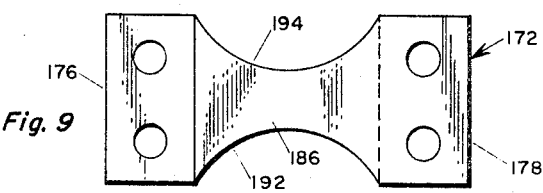
FIG. 9 is a plan view of a second one of the three leaf springs illustrated in FIG. 7.
Figure 10:
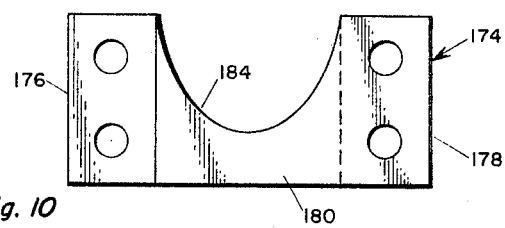
FIG. 10 is a plan view of a third one of the three leaf springs illustrated in FIG. 7.
Figure 7:
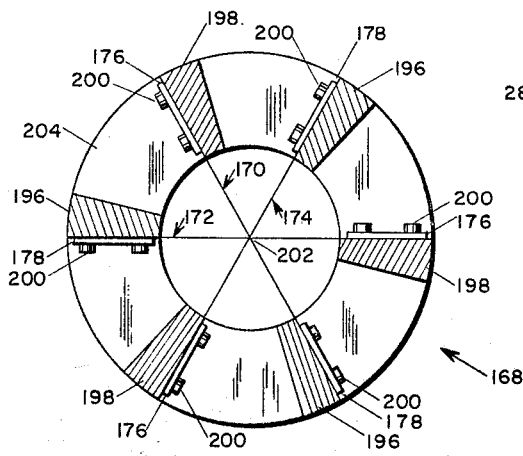
FIG. 7 is a sectional view similar to that of FIG. 2 illustrating a different type of flexure pivot.

A different type of flexure pivot 168 is illustrated in FIG. 7 having three leaf springs 170, 172 and 174 which are more clearly illustrated in FIGS. 8, 9 and 10 respectively. The springs 170 and 174 are identical and have relatively thick end portions 176 and 178 interconnected by a thinner web 180 with a parabolic notch 184 therein. The leaf spring 172 also has relatively thick end portions 176 and 178 interconnected by a thinner web 186 having curved notches 192 and 194 on opposite sides thereof. With this construction, each of the leaf springs can be criss-crossed as illustrated in FIG. 7 with the leaf spring 172 in the middle and with the end portions 178 thereof secured to the members 196 and the end portions 176 thereof connected to members 198 by suitable bolts 200. By virtue of the notches 184, 192 and 194, the leaf springs can be cross-crossed in the axial space taken up by one leaf spring. The members 196 are angularly spaced 120° from one another and the members 198 are accurately positioned therebetween and each of the leaf springs is very accurately affixed to the members 196 and 198 so that they criss-cross at a center 202. Each of the members 198 projects axially beyond the end portions of the leaf springs and is secured to a washer-shaped plate 204 and each of the member 196 projects axially in the opposite direction and is secured to a similar washer-shaped plate (not shown). The washer-shaped plate 204 may be secured to the gimbal ring 45, for example, as is the member 98 in FIG. 1 and the other washer-shaped plate (not shown) may be secured to the rotatable housing 26 as the member 96 is so that the three leaf springs will provide a stiff flexure pivot.

The flexure pivot 168 is made load compensated by bolting one of the leaf springs between a pair of the members 196 and 198 so that it is placed under compression, and bolting the other two leaf springs so that they are placed under tension, or vice versa, wherein one of the leaf springs is bolted under tension and the other two are bolted under compression. Since the three leaf spring flexure pivot is symmetrical, its spring constant is independent of load and no mass shift occurs under changing temperature.

Figure 11:
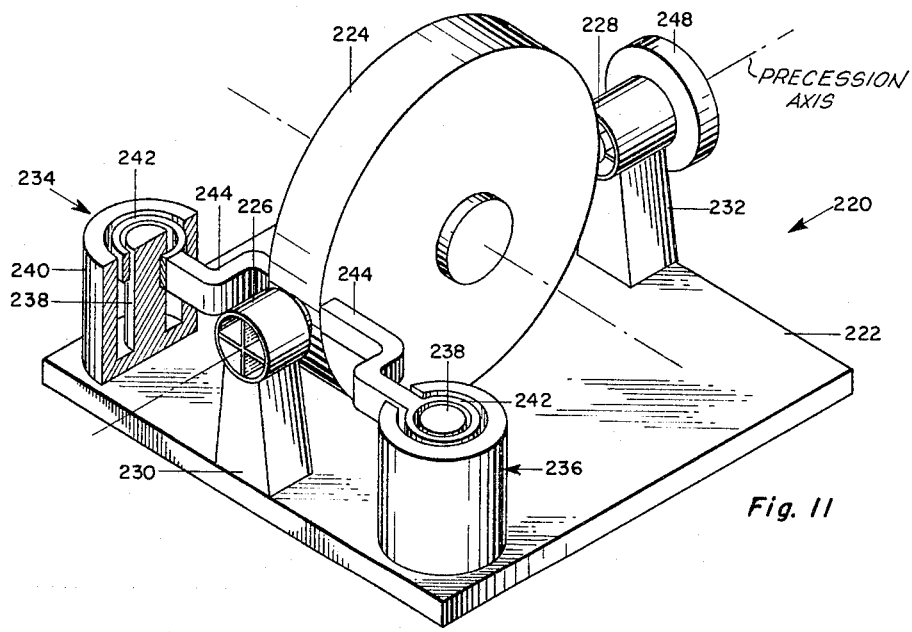
FIG. 11 is an isometric view of a platform gyro embodying features of the invention.

Referring to FIG. 11, a platform gyro 220 is illustrated with flexure pivots and electric spring compensation. It comprises a platform 222 having a gyro motor 224 pivotally supported on the platform by a pair of flexure pivots 226 and 228 which are modifications of the flexure pivot illustrated in FIGS. 2 and 3 and are supported on saddles 230 and 232, respectively, projecting upwardly from the platform 222.

A signal pickoff drum 248 may be mounted on the end of the flexure pivot 228 to provide an electrical indication of the pivotal movement of the gyro motor about the precession axis. Electric springs 234 and 236 are mounted on the platform 222 on opposite sides of the gyro motor to provide an accurate compensation for the restraining torque developed by the flexure pivots. Each of the electric springs comprises a permanent magnet having a center core 238 with a cylindrical portion 240 spaced thereabout to provide an annular homogeneous permanent magnetic field therebetween. A D'Arsonval coil 242 is positioned in this homogeneous permanent magnetic field and is carried on the end of an arm 244 fixed to the gyro motor 224 so as to pivot therewith. The coil 242 is a precision wound coil and is excited with D.C. current to produce a torque proportional to its deflection from the precession axis by inserting into or removing from the homogeneous magnetic field a number of turns of the coil proportional to the deflection. By providing an electric spring on each side of the gyro motor 224, as opposed to the single electric spring 51 mounted on one side of the gyro motor 40 as illustrated in FIG. 1, the gyro is made symmetrical to further reduce the possibility of producing an intolerable drift when the gyro is used for azimuth.

Figure 12:
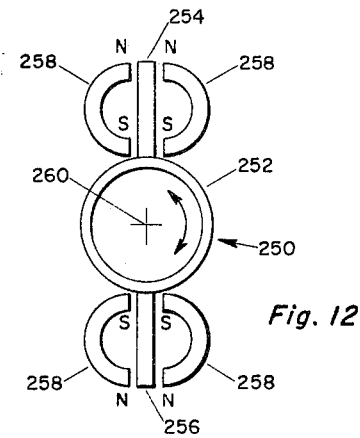
FIG. 12 is a side view of a magnetic spring embodying features of the invention.

Referring to FIG. 12 a magnetic compensating spring 250 is illustrated which comprises a ring 252 having armatures 254 and 256 projecting from opposite sides thereof. Four C-shaped magnets 258 are positioned in pairs on opposite sides of the armatures 254 and 256 with the poles arranged as indicated. With this construction the ring 252 can be secured on the outer end of the flexure pivot 226 of FIG. 11, for example, similar to the manner in which the signal pick-off 248 is secured on the outer end of the flexure pivot 228, and the magnets 258 can be supported by suitable means on opposite sides of the armatures 254 and 256 as illustrated. The ring 252, of course, is carefully positioned so that its center 260 lies directly on the precession axis, and when the gyro motor precesses in one direction or the other the ring 252 will rotate therewith to shift the armatures 254 and 256 out of the zero position as illustrated in FIG. 12 so that one magnet 258 from each pair can exert a greater attractive force on the armature associated therewith to compensate for the restrained torque developed by the flexure pivots. The armatures are preferably made of Permaloy and the strength of the permanent magnets 258 and the size of the air gaps with the armatures is carefully selected to make the compensating force produced by the magnets equal to the restraining torque of the flexure pivots.

Figure 13:
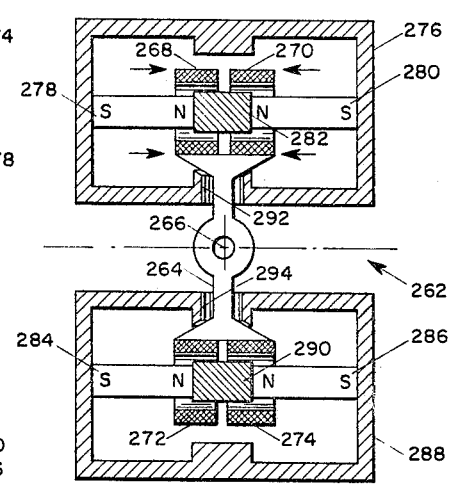
FIG. 13 is a sectional view of an electric spring embodying features of the invention.

Referring to FIG. 13, another type of electric spring 262 is illustrated which comprises an arm 264 adapted to be mounted on a gyro, such as the gyro 220 of FIG. 11 for example, for pivotal movement about an axis 266 which is coaxially aligned with the precession axis of the gyro. A pair of coaxially aligned coils 268 and 270 are fixed on one end of the arm for pivotal movement therewith, and a second pair of coaxially aligned coils 272 and 274 are fixed on the other end of the arm. A housing 276 encloses the coils 268 and 270 and supports aligned magnets 278 and 280 on the center line of the coils with a spacer 282 of non-magnetic material therebetween. Permanent magnets 284 and 286 are similarly supported by a housing 288 on the center line of the coils 272 and 274 with a spacer 290 therebetween of non-magnetic material. Each of the housings 276 and 288 is adapted to be fixed to the gyro platform or gimbal supporting the gyro motor and the arm 264 extends through slightly enlarged apertures 292 and 294 in each of the housings, respectively, to allow the arm to pivot with the gyro motor about the precession axis in either direction. Each of the coils 268, 270, 272, 274 is excited with D.C. current in a direction to produce opposing magnetic fields. For example the coils 268 and 272 are excited to produce magnetic fields directed to the right as viewed in FIG. 13 and the coils 270 and 274 are exited to produce magnetic fields directed to the left. By positioning the poles of the permanent magnets with the north poles adjacent to one another, the coils produce zero torque on the arm in the zero position, as illustrated. However, when pivoted in either a clockwise or a counter clockwise direction through a small angle when the gyro motor precesses, the coils cooperate with the permanent magnets to produce a torque in the direction of the pivotal movement to compensate for the restraining torque developed in the flexure pivots of the gyro.

Figure 14:
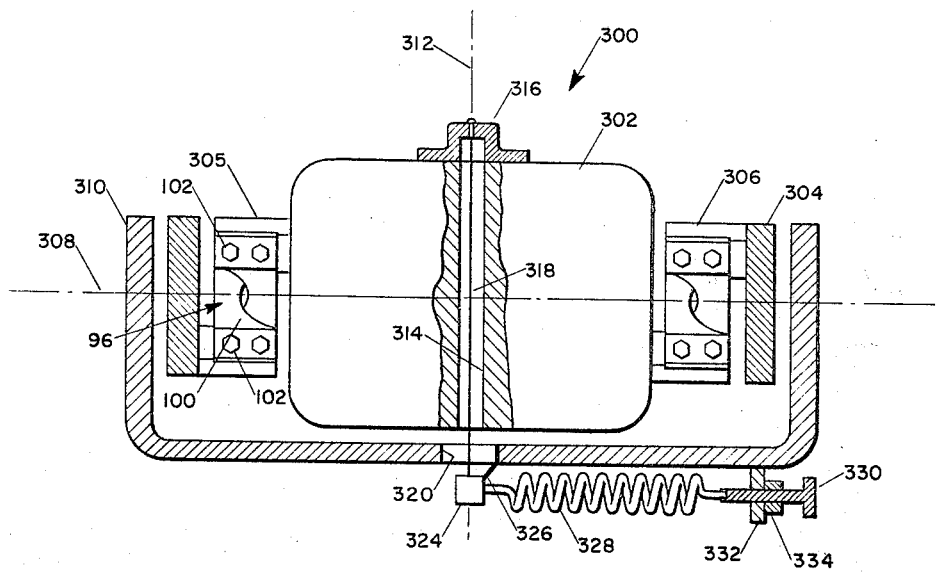
FIG. 14 is a sectional view of a gyro illustrating still another embodiment of the invention.

Referring to FIG. 14, a two degree of freedom gyro 300 is shown which illustrates another embodiment of the invention. It is comprised of a gyro motor 302 pivotally supported on a gimbal 304 by flexure pivots 305 and 306 for precession about an axis 308, both flexure pivots being similar to the flexure pivot 42 of FIG. 1. The gimbal 304 is in turn supported on a rotating housing 310 by suitable flexure pivots (not shown) for pivotal movement about an axis perpendicular to the plane defined by the precession axis 308 and the spin axis 312 of the gyro motor 302. The gyro motor 302 has a hollow shaft 314 enclosed at the upper end by an end bell 316. A wire 318 is connected to the end bell and extends downwardly through the hollow shaft 314 and through a central aperture 320 in the bottom of the rotating housing. The lower end of the wire is connected to a suitable clamping block 324 supported below the central aperture 320 on the spin axis of the gyro motor 302 by a flexible element 326 fixed to and projecting from the wall of the central aperture 320. A helical spring 328 is connected between the clamping block 324 and the end of an adjusting screw 330 threadably engaged with and projecting through a lug 332 depending downwardly from the rotating housing, a suitable lock nut 334 being provided to lock the adjusting screw 330 in adjusted position.

With this construction the screw 330 can be adjusted to vary the downward pull exerted on the wire 318 by the compensating spring 328, the flexible element 326 being relatively stiff but capable of flexing enough to accomplish this. Thus when the gyro motor is in a zero position the downward pull of the wire 318 will not exert any torque, but when the gyro motor precesses in any angular direction the lead wire 318 will be displaced from the spin axis of the gyro motor and will exert a torque thereon to compensate for the restraining torque developed by the flexure pivots.

Referring to FIGS. 16 and 17, a different type of flexure pivot 340 is illustrated having two leaf springs 342 and 344. Each of the leaf springs has an L-shaped web 346 with legs 348 and 350 projecting from the ends thereof at an angle and parallel with one another as most clearly illustrated in FIG. 17. Each of the legs is bent along bending lines 352 and 354 and the leg 348 on the upper end of the leaf spring 342 is fitted over and secured to the leg 350 on the lower end of the leaf spring 344. Similarly the leg 348 of the leaf spring 344 is fitted over and secured to the leg 350 on the lower end of the leaf spring 342. Each pair of legs 348 and 350 secured together in this manner provides thickened flanges 356 and 358 having bolt holes 360 extending therethrough to enable the flange 356 to be bolted to a support, such as the rotatable housing 26 in FIG. 1, and the flange 358 to be bolted to the gyro motor to pivotally support the gyro motor for precession about an axis 362.

Referring to FIG. 18, another type of flexure pivot 380 is illustrated which comprises three criss-crossed wires 382, 384 and 386 interconnecting stubshafts 388 and 390. Each of the wires is connected to the stubshafts at equally spaced points about the peripheries of the ends thereof and are criss-crossed at a point 392 on the aligned axes of the stubshafts 388 and 390 in a manner to cooperate with a second flexure pivot of the same type to support a gyro for precession about the axis defined by the points 392.

A more detailed example of such a three wire flexure pivot is shown in the gyro 394 illustrated in FIG. 19 which comprises a platform 396 having cylindrical supports 398 and 400 mounted in coaxially aligned relation thereabove by saddles 402 and 404. Each of the supports has a stub shaft 406 projecting therefrom and terminating in frustro-conical end portions 408. Three wires 410, only two of which are visible in FIG. 19, interconnect each of the frustro-conical end portions 408 with a corresponding frustro-conical end portion 412 on the ends of stub shafts 414 projecting from opposite sides of a gyro motor 416. The wires 410 criss-cross on the aligned axes of each of the stub shafts and which is also the precession axis of the gyro motor 416. The wires are clamped to the frustro-conical end portions 408 and 412 by frustro-conical rings 418 which are shown in section in FIG. 20 and are bolted to the frustro-conical end portions by suitable bolts 420. As most clearly illustrated in FIGS. 20 and 21, each of the rings 418 has a plurality of boltholes 422 equally spaced thereabout in position to be aligned with internally threaded boltholes 424 in the frustro-conical end portions 408 to enable the bolts 420 to clamp the ring to the frustro-conical end portion as described above. The inner face of each ring 418 is provided with an annular groove 426 which forms annular shoulders on both sides thereof to provide a better grip on the wires 410. In order to maintain the wires 410 taut the end of the cylindrical support 398 adjacent to the stub shaft 406 has two slots 428 and 430 machined therein from opposite sides thereof to form an integral spring on the end of the cylindrical support to enable the wires to be placed in tension. Since this three wire construction is symmetrical, it provides the same advantages as the flexure pivot 168 illustrated in FIG. 7; namely, its spring constant is independent of load and no mass shift occurs under changing temperatures.

While it will be apparent that the embodiments of the invention described above are well calculated to fulfil the objects of the invention, it will be appreciated that many changes, modifications and revisions may be made without departing from the spirit or scope of the invention as defined in the following claims.

What is claimed is:

1. In a tight loop stabilized gyroscope, a supporting member, a supported member, a pair of flexure pivots pivotally mounting said supported member on said supporting member for precession about an axis perpendicular to the spin axis of the gyroscope, and compensating means for exerting a torque on said supported member in opposition to the restraining torque developed by said flexure pivots when deflected, the radial elasticity of each of said flexure pivots being equal to the combined axial elasticity of both of said pivots whereby said flexure pivots are iso-elastic.

2. In a tight loop stabilized gyroscope, a supporting member, a supported member, a pair of flexure pivots pivotally mounting said supported member on said supporting member for precession about an axis perpendicular to the spin axis of the gyroscope, and compensating means for exerting a torque on said supported member in opposition to the restraining torque developed by said flexure pivots when deflected, the radial elasticity of each of said flexure pivots being twice its axial elasticity whereby each of said flexure pivots is iso-elastic.

3. In a tight loop stabilized gyroscope, a supporting member, a supported member, a pair of flexure pivots pivotally mounting said supported member on said supporting member for precession about an axis perpendicular to the spin axis of the gyroscope, and compensating means for exerting a torque on said supported member in opposition to the restraining torque developed by said flexure pivots when deflected, said supported member being fixed to the gyro motor of said gyroscope, and said compensating means comprising a pair of permanent magnets symmetrically disposed on opposite sides of the precession axis defined by said flexure pivots, each of said magnets having a configuration providing an annular air gap with a homogeneous magnetic field thereacross, arms projecting from opposite sides of said gyro motor toward each of said magnets, and a coil excited by D.C. current on the end of each of said arms for pivotal movement therewith, each of said coils being positioned to have the turns thereof inserted and removed from said homogeneous magnetic field when the gyro motor precesses to exert a torque on the gyro motor proportional to the deflection thereof, each of said coils cooperating with the magnet associated therewith to exert equal and opposite torques when the gyro motor is in its zero position.

4. In a tight loop stabilized gyroscope, a supporting member, a supported member, a pair of flexure pivots pivotally mounting said supported member on said supporting member for precession about an axis perpendicular to the spin axis of the gyroscope, and compensating means for exerting a torque on said supported member in opposition to the restraining torque developed by said flexure pivots when deflected, one of said flexure pivots comprising a pair of first spaced elements, a pair of leaf springs each having a thin middle portion and thicker end portions with a notch in the middle portion thereof to reduce its width by more than one-half at the center line thereof, said end portions being affixed to said first elements to interconnect the elements with the leaf springs crossed at 90° with one another and said notches in confronting overlapped relation so that the width of the cross leaf springs is substantially equal to the width of the individual leaf springs, one of said first elements being fixed to said supporting member and the other of said first elements being fixed to said supported member, the other of said flexure pivots comprising a pair of second spaced elements interconnected by stiff wires crossed at 90° with one another, one of said second elements being fixed to said supported member with the center at which said wires cross in position to cooperate with the center at which said leaf springs cross to define precession axis.

5. The invention as defined in claim 4 including a helical spring interconnecting the elements connected to said other flexure pivot and exerting a pulling force thereon having a line of action passing perpendicularly through said precession axis when the gyroscope is in its zero position relative to said axis.

6. A flexure pivot for a gyro comprising a pair of spaced elements, a pair of leaf springs each having a thin middle portion and thicker end portions with a notch in the middle portion thereof reducing its width by more than one-half at the center line thereof, said end portions being fixed to said elements to interconnect the elements with the leaf springs crossed at 90° and said notches in confronting overlapped relation so that the width of the crossed leaf springs is substantially equal to the width of the individual leaf springs, the radial elasticity of said flexure pivot being twice its axial elasticity, whereby the flexure pivot is iso-elastic.

7. A flexure pivot for a gyro comprising a pair of spaced coaxially aligned stub shafts interconnected by three wires, the ends of said wires being secured to the ends of said stub shafts at equally spaced points about the periphery thereof with the wires criss-crossing effectively at a point lying on the axis of the stub shafts whereby one of the stub shafts can be fixed to a support and the other said stub shafts can be fixed to a gyro motor to cooperate with a similar flexure pivot for supporting the gyro motor for precession about an axis defined by the points at which said wires criss-cross.

8. A two degree of freedom gyro comprising a gyro motor, a housing, two pairs of flexure pivots pivotally mounting said gyro motor within said housing for precession perpendicular to the spin axis of the gyro motor, an arm projecting from said gyro motor along the spin axis thereof, means mounted on said housing defining an annular air gap concentric with said arm when said gyro motor is in its zero position, and an annular armature mounted on said arm for pivotal movement therewith, said armature projecting into said air gap to produce a torque on the arm when it is deflected from the zero position to compensate for the restraining torque developed by said flexure pivots, said armature projecting an equal distance into said air gap at all points when the gyro motor is in its neutral position so that no torque is exerted thereon in the zero position.

9. The invention as defined in claim 8 wherein said armature is a coil excited by D.C. current and mounted on said arm with the axis thereof concentric with the spin axis of the gyro motor.

10. The invention as defined in claim 9 including means for rotatably mounting said housing for rotation about the spin axis of said gyro motor.

11. An electric spring for compensating for the restraining torque developed by a pair of flexure pivots supporting a gyro motor and defining the precession axis thereof comprising an arm adapted to be mounted for pivotal movement with the gyro motor with the precession axis passing perpendicularly therethrough, a pair of coaxially aligned coils mounted symmetrically on each end of said arm with the axes thereof extending perpendicular to said arm, the coils of each pair of coils being wound in opposite directions and excited by D.C. current to produce opposing magnetic fields, and a pair of spaced permanent bar magnets associated with each of said pairs of coils, each pair of bar magnets being coaxially aligned with one another and fixed on the center line of the pair of coils associated therewith, the confronting poles of said magnets being like poles and projecting partially into the coils an equal distance when said arm is in a zero position perpendicular to said magnets.

12. A platform gyro comprising a platform, a pair of supporting stub shafts, means for supporting said stub-shafts above said platform is spaced coaxially aligned relation, a gyro motor having coaxially aligned stub shafts projecting from opposite sides thereof, and a plurality of criss-crossed wires interconnecting the ends of each of said supporting stub shafts with an end of one of the stub shafts projecting from the gyro motor to support the stub shafts of the gyro motor in coaxially aligned relation with the supporting stub shafts, said wires criss-crossing effectively at a point lying on the axis of the stub shafts with the ends thereof secured about the peripheries of each of the stub shafts in equal angularly spaced relation.

13. The invention as defined in claim 12 including means for resiliently tensioning said criss-crossed wires.

14. The invention as defined in claim 12 wherein the ends of each of the stub shafts have identical frustroconical end portions the projected apexes of which lie on the point at which said wires criss-cross, and wherein the ends of the wires are clamped to each of said frustroconical end portions by a frustro-conical clamping ring secured to each of the frustro-conical end portions.

15. The invention as defined in claim 14 wherein one of said supporting stub shafts has at least one radial notch formed therein from one side thereof and at least one radial notch formed therein from the other side thereof, said notches being located near the frustro-conical end portion associated therewith to provide an integral spring for resiliently tensioning the criss-crossed wires.

16. A two degree of freedom gyro comprising a housing, a gimbal mounted within said housing for pivotal movement about a gimbal pivot axis, a gyro motor having a hollow shaft concentric with its spin axis, a pair of flexure pivots for pivotally mounting said gyro motor within said gimbal for precession about an axis defined by the flexure pivots perpendicular to the motor spin axis and gimbal pivot axis, a wire extending through said hollow shaft, means for supporting one end of the wire on the spin axis of the gyro motor, means for fixing the other end of the said wire to said housing at a point lying on the spin axis of the gyro motor when it is in its zero position, and spring means for exerting a force on said last mentioned means in a manner to place said wire under tension and compensate for the restraining torque developed by said flexure pivots when deflected.

17. The invention as defined in claim 16, wherein said housing is rotated about the spin axis of the gyro motor.

18. The invention as defined in claim 16 including means for adjusting the force exerted by said spring means to vary the compensation provided thereby.

19. A two degree of freedom gyro comprising a gyro motor, a gimbal, a first pair of flexure pivots mounting said gyro motor within said gimbal for precession about an axis defined by the flexure pivots, supporting means, a second pair of flexure pivots mounting said gimbal on said supporting means and defining a second precession axis, and means for rotating said supporting means about the spin axis of said gyro motor.

References Cited by the Examiner

UNITED STATES PATENTS

| | | | |
|---|---|---|---|
| 1,226,882 | 5/1917 | Henderson | 74—5 X |
| 2,417,081 | 3/1947 | Lynn | 74—54.2 |
| 2,517,612 | 8/1950 | Varian | 74—5 X |
| 2,606,447 | 8/1952 | Boltinghouse | 74—5 |
| 2,735,731 | 2/1956 | Freebairn et al. | 74—5 X |
| 2,752,684 | 7/1956 | Bentley et al. | 74—5 X |
| 2,793,028 | 5/1957 | Wheeler | 74—5 X |
| 2,996,631 | 8/1961 | Evans | 74—5 X |

FRED C. MATTERN, Jr., *Primary Examiner.*

BROUGHTON G. DURHAM, *Examiner.*

T. W. SHEAR, P. W. SULLIVAN, *Assistant Examiners.*